UNITED STATES PATENT OFFICE.

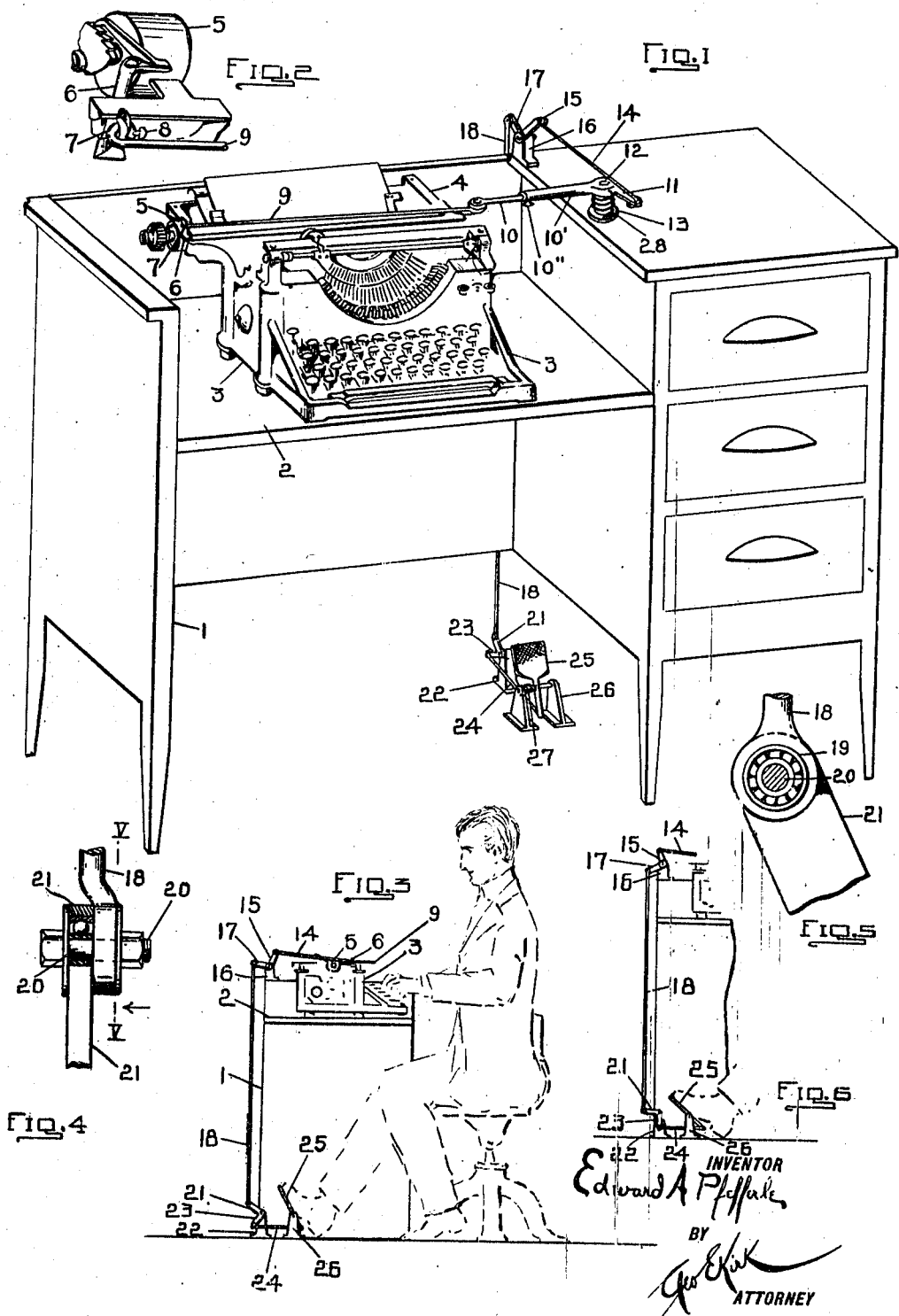

EDWARD A. PFEFFERLE, OF BURLEY, IDAHO.

TYPE-WRITER CARRIAGE AND PLATEN ACTUATOR.

1,313,951.   Specification of Letters Patent.   Patented Aug. 26, 1919.

Application filed August 29, 1917. Serial No. 188,739.

*To all whom it may concern:*

Be it known that I, EDWARD A. PFEFFERLE, a citizen of the United States of America, residing at Burley, Idaho, have invented new and useful Type-Writer Carriages and Platen Actuators, of which the following is a specification.

This invention relates to controlling mechanism, as the foot positioning of a member to facilitate hand operations.

This invention has utility when incorporated in typewriters for carriage movement and line spacing or platen actuation.

Referring to the drawings:

Figure 1 is a perspective view of an embodiment of the invention for typewriter carriage and platen actuation;

Fig. 2 is a detail view, on an enlarged scale, of the connection of the device to the machine or typewriter;

Fig. 3 is a side elevation of the device of Fig. 1 with the end of the stand removed, showing the position of the device of the invention as to the machine and the operator;

Fig. 4 is a fragmentary view of one of the anti-friction joints of the device;

Fig. 5 is a section on the line V—V, Fig. 4, looking in the direction of the arrow; and Fig. 6 is a fragmentary view of the linkage slightly shifted from the position in Fig. 3.

The desk or typewriter stand 1 may have the table or platform 2 for the typewriter 3. Transversely movable on the typewriter 3 is a carriage 4 rotatably mounted in which is a platen 5 as actuable by a lever 6, the pulling of which also may serve to draw the carriage into position, as to start a new line and simultaneously effect line spacing by rotating the platen 5. Accordingly a single pull movement to the right serves the dual purpose.

The device of this invention relieves the operator from this hand operation, thus permitting the operator to keep the hands in position as to the keyboard, saving time and increasing working efficiency, with relief as to exertion of the heavier or harder hand work. An eye 7 may be detachably mounted on the upstanding finger engagement portion of the lever 6 by a thumb screw 8 with a link 9 extending therefrom to the long arm embodying the relatively telescopic sections 10, 10'. Adjustment of the arm 10, 10' may be effected for carriage travels according to margin desired, through the locking action of the thumb screw 10''. This arm 10, 10', is part of the angle lever having the short arm 11, having the anti-friction fulcrum bearing 12 carried by the upstanding bracket 13, which may be screwed in the desired position on the desk or stand as to the machine 3 for proper alining of the link 9 mean position in its travel range.

The short arm 11 of the lever 10, 10', 11, is connected by the link 14 to the arm 15 fulcrumed in the bearing 16 disposed adjacent the rear of the desk or stand 1, to have the second arm 17 of this angle lever 15, 17, overhang the rear of the stand and connect to the downwardly extending link 18 in the rear of the stand. This rearward extending of the link 14 and the disposal of the link 18 clear of the stand or desk 1, eliminates any necessity for desk alteration and permits use of the device with drop top desks.

This link or rod 18 is provided with an anti-friction bearing 19 embracing the pivot pin 20 mounted by the arm 21 anti-frictionally carried by the bracket 22. Rigid with the arm 21 to form therewith an angle lever is the arm 23 having anti-friction bearing connection to a link 24 extending forwardly to the treadle 25 mounted as a lever on the bracket 26 disposed in a convenient position for the treadle to be operated by the typist at the desk.

Thrusting of the toe forward say for movement of the treadle from the position shown in Fig. 3 to that shown in Fig. 6, at once acts through the anti-friction linkage and levers for drawing the carriage 4 to the right, according to the extent of treadle actuation up to full travel of the carriage with the supplemental same direction line spacing travel for rotating the platen 5 to start a new line. The release from actuation pressure may be no strain upon the operator, for the heel may support the foot in position for the succeeding carriage travel and line shifting.

In order that there may be no drag upon the normal carriage travel in typing, a torsion spring 27 is connected to the treadle 25 and extends to the bracket 26. The action of this spring may be supplemented by the additional torsion spring 28 at the bracket 13 coacting with the angle lever 10', 11.

By releasing the thumb screw 8, the link 9 may be detached from the machine, so the machine may be dropped into the cabinet or covered. This detaching may be speedily accomplished and as readily re-connected when assembly for use is desired.

What is claimed and it is desired to secure by Letters Patent is:

A typewriter having a movable carriage, a platen rotatably mounted in said carriage, a carriage carried member operable in a common direction to rotate the platen and move the carriage and having a forwardly extending rockable portion, and an actuator for the member including a treadle, a first link extending rearwardly therefrom, a first angle lever to which the first link extends, a second upwardly extending link from the first angle lever, a second angle lever from the second link, a third link extending forwardly from the second angle lever, a third angle lever to which the third link extends, fulcrum mounting means providing parallel horizontal axis bearings for the treadle, first and second angle levers and a vertical axis bearing for the third angle lever, and a fourth link extending from the third angle lever to the rockable portion of the member transversely of the typewriter and forwardly thereof for treadle actuation of the member, there being means permitting longitudinal adjustment of the linkage lever mechanism between its connection to the carriage and the third lever fulcrum mounting, said linkage lever mechanism comprising the single link between each pair of levers.

In witness whereof I affix my signature.

EDWARD A. PFEFFERLE.